US012645997B2

(12) United States Patent
Dahlem et al.

(10) Patent No.: US 12,645,997 B2
(45) Date of Patent: Jun. 2, 2026

(54) INDIVIDUALIZED CLASSIFICATION THRESHOLDS FOR MACHINE LEARNING MODELS

(71) Applicant: UnitedHealth Group Incorporated, Minnetonka, MN (US)

(72) Inventors: Dominik Roman Christian Dahlem, Dublin (IE); Gregory D. Lyng, Minneapolis, MN (US); Christopher A. Hane, Irvine, CA (US); Eran Halperin, Santa Monica, CA (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 661 days.

(21) Appl. No.: 18/172,519

(22) Filed: Feb. 22, 2023

(65) Prior Publication Data

US 2024/0070533 A1 Feb. 29, 2024

Related U.S. Application Data

(60) Provisional application No. 63/373,214, filed on Aug. 23, 2022.

(51) Int. Cl.
*G06N 20/00* (2019.01)
*G06N 7/01* (2023.01)

(52) U.S. Cl.
CPC .............. *G06N 20/00* (2019.01); *G06N 7/01* (2023.01)

(58) Field of Classification Search
CPC ................................. G06N 20/00; G06N 7/01
See application file for complete search history.

(56) References Cited

U.S. PATENT DOCUMENTS

| | | | |
|---|---|---|---|
| 10,990,901 B2 | 4/2021 | Deo et al. | |
| 11,263,550 B2 | 3/2022 | Vasconcelos et al. | |
| 11,416,500 B2 | 8/2022 | Tristan et al. | |
| 11,436,444 B1 | 9/2022 | Wu et al. | |
| 11,586,849 B2 | 2/2023 | Zhang et al. | |

(Continued)

OTHER PUBLICATIONS

Kallus ("Residual Unfairness in Fair Machine Learning from Prejudiced Data" Jun. 7, 2018) arXiv:1806.02887v1 [stat.ML] Jun. 7, 2018 (Year: 2018).*

(Continued)

*Primary Examiner* — Usmaan Saeed
*Assistant Examiner* — Su-Ting Chuang
(74) *Attorney, Agent, or Firm* — Alston & Bird LLP

(57) ABSTRACT

Various embodiments of the present disclosure describe feature bias mitigation techniques for machine learning models. The techniques include generating or receiving a contextual bias correction function, a protected bias correction function, or an aggregate bias for a machine learning model. The aggregate bias correction function for the model may be based on the contextual or protected bias correction functions. At least one of the generated or received functions may be configured to generate an individualized threshold tailored to specific attributes of an input to the machine learning model. Each of the functions may generate a respective threshold based on one or more individual parameters of the input. An output from the machine learning model may be compared to the individualized threshold to generate a bias adjusted output that accounts for the individual parameters of the input.

18 Claims, 6 Drawing Sheets

(56) References Cited

U.S. PATENT DOCUMENTS

| | | | |
|---|---|---|---|
| 2010/0014762 | A1 | 1/2010 | Renders et al. |
| 2015/0052059 | A1 | 2/2015 | Everhart |
| 2018/0301223 | A1 | 10/2018 | Alter |
| 2020/0184350 | A1 | 6/2020 | Bhide et al. |
| 2021/0374581 | A1 | 12/2021 | Wei et al. |
| 2021/0383268 | A1 | 12/2021 | Miroshnikov et al. |
| 2022/0005077 | A1 | 1/2022 | Krishnamurthy et al. |
| 2022/0101062 | A1 | 3/2022 | Fischer et al. |
| 2022/0114225 | A1 | 4/2022 | Murugesan et al. |
| 2022/0129762 | A1 | 4/2022 | Sengupta et al. |
| 2022/0138632 | A1 | 5/2022 | Gueret et al. |
| 2022/0171991 | A1 | 6/2022 | Das et al. |
| 2022/0245339 | A1 | 8/2022 | Panda et al. |
| 2024/0070534 | A1 | 2/2024 | Dahlem et al. |

OTHER PUBLICATIONS

Jang ("Group-Aware Threshold Adaptation for Fair Classification" Nov. 8, 2021) arXiv:2111.04271v1 [cs.LG] Nov. 8, 2021 (Year: 2021).*

Singh ("Developing a Novel Fair-Loan Classifier through a Multi-Sensitive Debiasing Pipeline: DualFair" Mar. 12, 2022) Mach. Learn. Knowl. Extr. 2022, 4(1), 240-253; https://doi.org/10.3390/make4010011 (Year: 2022).*

Marcinkevics ("Debiasing Deep Chest X-Ray Classifiers using Intra- and Post-processing Methods" Jul. 26, 2022) arXiv:2208.00781v1 [cs.CV] Jul. 26, 2022 (Year: 2022).*

Feldman, Tal et al. "End-To-End Bias Mitigation - Removing Gender Bias in Deep Learning," arXiv:2104.02532v3 [cs.LG], Jun. 21, 2021, (9 pages), available online: https://arxiv.org/pdf/2104.02532.pdf.

Lohia, Pranay K. et al. "Bias Mitigation Post-Processing for Individual and Group Fairness," arXiv:1812.06135v1 [cs.LG], Dec. 14, 2018, (5 pages), available online: https://arxiv.org/pdf/1812.06135.pdf.

Obermeyer, Ziad et al. "Dissecting Racial Bias in an Algorithm Used to Manage the Health of Populations," Science, vol. 366, Issue 6464, pp. 447-453, DOI: 10.1126/science.aax2342.

Sullivan, Tom. "AI Regulations Are Coming: Health Care Has a Window to Reverse Course and Address Bias Now," Health Evolution, Mar. 9, 2022, (10 pages), [Retrieved from the Internet May 16, 2023] <URL: https://www.healthevolution.com/insider/ai-regulations-are-coming-health-care-has-a-window-to-reverse-course-and-address-bias-now/>.

Non-Final Rejection Mailed on Dec. 11, 2025 for U.S. Appl. No. 18/172,521, 24 page(s).

Final Rejection Mailed on Apr. 23, 2026 for U.S. Appl. No. 18/172,521, 27 page(s).

* cited by examiner

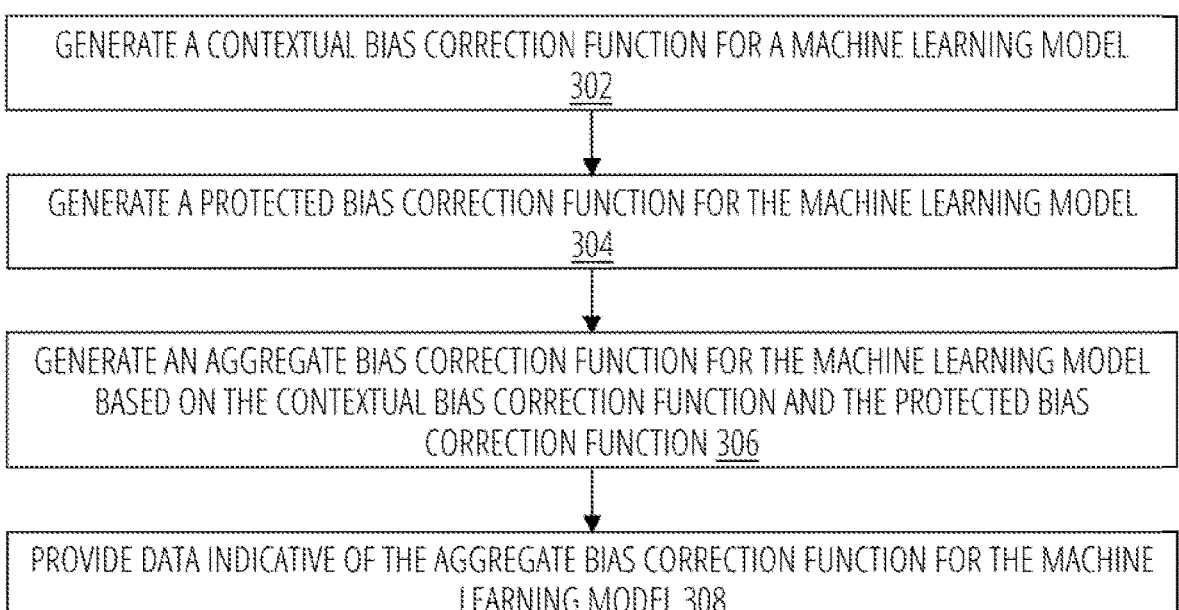

GENERATE A CONTEXTUAL BIAS CORRECTION FUNCTION FOR A MACHINE LEARNING MODEL
302

GENERATE A PROTECTED BIAS CORRECTION FUNCTION FOR THE MACHINE LEARNING MODEL
304

GENERATE AN AGGREGATE BIAS CORRECTION FUNCTION FOR THE MACHINE LEARNING MODEL BASED ON THE CONTEXTUAL BIAS CORRECTION FUNCTION AND THE PROTECTED BIAS CORRECTION FUNCTION 306

PROVIDE DATA INDICATIVE OF THE AGGREGATE BIAS CORRECTION FUNCTION FOR THE MACHINE LEARNING MODEL 308

SELECT CONTEXTUAL CORRECTION PARAMETERS 402

SELECT PROTECTED CORRECTION PARAMETERS 404

GENERATE OPTIMIZED CONTEXTUAL CORRECTION PARAMETERS 406

GENERATE OPTIMIZED PROTECTED CORRECTION PARAMETERS 408

GENERATE CORRECTION PARAMETERS 410

RECEIVE AN AGGREGATE BIAS CORRECTION FUNCTION FOR A MACHINE LEARNING MODEL 502

GENERATE, USING THE AGGREGATE BIAS CORRECTION FUNCTION, AN INDIVIDUALIZED THRESHOLD CORRESPONDING TO AN INPUT DATA OBJECT FOR THE MACHINE LEARNING MODEL 504

GENERATE, USING THE MACHINE LEARNING MODEL, A PREDICTIVE OUTPUT FOR THE INPUT DATA OBJECT 506

GENERATE A BIAS ADJUSTED OUTPUT FOR THE INPUT DATA OBJECT BASED ON A COMPARISON BETWEEN THE INDIVIDUALIZED THRESHOLD AND THE PREDICTIVE OUTPUT 508

PROVIDE DATA INDICATIVE OF THE BIAS ADJUSTED OUTPUT 510

INDIVIDUALIZED CLASSIFICATION THRESHOLDS FOR MACHINE LEARNING MODELS

CROSS-REFERENCE TO RELATED APPLICATIONS

This application claims the benefit of U.S. Provisional Application No. 63/373,214, entitled "DETERMINATION OF MULTIPLE POST-MODEL ACTION THRESHOLDS TO REDUCE BIAS IMPACT," and filed Aug. 23, 2022, the entire contents of which are hereby incorporated by reference.

BACKGROUND

Various embodiments of the present disclosure address technical challenges related to feature bias mitigation for machine learning models given limitations of existing machine learning approaches. Some existing approaches for handling feature bias, for example, may include (i) pre-processing approaches for transforming training data to address feature bias in a specific training dataset and (ii) in-processing/post-processing approaches for regularizing machine learning parameters/outputs to address feature bias in specific machine learning models. These approaches are restricted to specific training datasets, training processes, model architectures, and/or model outputs and are not generalizable across multiple different scenarios. Moreover, each approach addresses feature bias at a subpopulation level and fails to account for individual variations between data points with a subpopulation. Various embodiments of the present disclosure make important contributions to various existing feature bias mitigation approaches by addressing each of these technical challenges.

BRIEF SUMMARY

Various embodiments of the present disclosure disclose approaches for mitigating feature bias in machine learning models. The feature mitigation approaches leverage feature bias correction functions to generate individualized thresholds that are specifically tailored to each input data object of a machine learning model. The feature bias correction functions may be optimized for a specific machine learning model through iterative training techniques disclosed herein. In this way, using some of the techniques described herein, feature bias correction functions may be generated that are generalizable across a wide variety of training datasets, training processes, model architectures, model outputs, and/ or the like.

In an embodiment, a computer-implemented method is provided. The computer-implemented method can include generating, by one or more processors, a contextual bias correction function for a machine learning model. The contextual bias correction function can include a plurality of contextual correction parameters configured to output an individualized contextual threshold for an input data object of the machine learning model based at least in part on a plurality of contextual attributes of the input data object. In addition, or alternatively, the computer-implemented method can include generating, by the processors, a protected bias correction function for the machine learning model. The protected bias correction function can include a plurality of protected correction parameters configured to output an individualized protection threshold for the input data object based at least in part on a plurality of protected attributes of the input data object. The computer-implemented method can include generating, by the processors, an aggregate bias correction function for the machine learning model based at least in part on the contextual bias correction function and the protected bias correction function. And, the computer-implemented method can include providing, by the processors, data indicative of the aggregate bias correction function. The aggregated bias correction function can be utilized with the machine learning model to generate a bias adjusted output for the input data object.

In another embodiment, a computing apparatus is provided. The computing apparatus can include a processor and memory including program code. The memory and the program code can be configured to, when executed by the processor, cause the computing apparatus to generate a contextual bias correction function for a machine learning model. The contextual bias correction function can include a plurality of contextual correction parameters configured to output an individualized contextual threshold for an input data object of the machine learning model based at least in part on a plurality of contextual attributes of the input data object. In addition, or alternatively, the computing apparatus can be configured to generate a protected bias correction function for the machine learning model. The protected bias correction function can include a plurality of protected correction parameters configured to output an individualized protection threshold for the input data object based at least in part on a plurality of protected attributes of the input data object. The computing apparatus can be configured to generate an aggregate bias correction function for the machine learning model based at least in part on the contextual bias correction function and the protected bias correction function. The computing apparatus can be configured to provide data indicative of the aggregate bias correction function. The aggregated bias correction function can be utilized with the machine learning model to generate a bias adjusted output for the input data object.

In yet another embodiment, a computer program product comprising a non-transitory computer-readable storage medium is provided. The non-transitory computer-readable storage medium can include instructions that, when executed by a computing apparatus, cause the computing apparatus to generate a contextual bias correction function for a machine learning model. The contextual bias correction function can include a plurality of contextual correction parameters configured to output an individualized contextual threshold for an input data object of the machine learning model based at least in part on a plurality of contextual attributes of the input data object. In addition, or alternatively, the computing apparatus can be caused to generate a protected bias correction function for the machine learning model. The protected bias correction function can include a plurality of protected correction parameters configured to output an individualized protection threshold for the input data object based at least in part on a plurality of protected attributes of the input data object. The computing apparatus can be caused to generate an aggregate bias correction function for the machine learning model based at least in part on the contextual bias correction function and the protected bias correction function. The computing apparatus can be caused to provide data indicative of the aggregate bias correction function. The aggregated bias correction function can be utilized with the machine learning model to generate a bias adjusted output for the input data object.

The optimized feature bias correction functions may be applied to any input data object to generate thresholds that are tailored to the individual attributes of the input data object. By doing so, the present disclosure provides improved machine learning techniques that overcome the technical challenges of previous feature bias mitigation approaches that lack generality and fail to account for individual attributes of a specific input.

In an embodiment, a computer-implemented method is provided. The computer-implemented method can include receiving, by one or more processors, an aggregate bias correction function for a machine learning model. The computer-implemented method can include generating, by the processors and using the aggregate bias correction function, an individualized threshold corresponding to an input data object for the machine learning model. The individualized threshold can be based at least in part on (i) a plurality of contextual attributes of the input data object and (ii) a plurality of protected attributes of the input data object. The computer-implemented method can include generating, by the processors and using the machine learning model, a predictive output for the input data object based at least in part on the plurality of contextual attributes. The computer-implemented method can include generating, by the processors, a bias adjusted output for the input data object based at least in part on a comparison between the individualized threshold and the predictive output. The computer-implemented method can include providing, by the processors, data indicative of the bias adjusted output.

In another embodiment, a computing apparatus is provided. The computing apparatus can include a processor and memory including program code. The memory and the program code can be configured to, when executed by the processor, cause the computing apparatus to receive an aggregate bias correction function for a machine learning model. The computing apparatus can be configured to generate, using the aggregate bias correction function, an individualized threshold corresponding to an input data object for the machine learning model. The individualized threshold is based at least in part on (i) a plurality of contextual attributes of the input data object and (ii) a plurality of protected attributes of the input data object. The computing apparatus can be configured to generate, using the machine learning model, a predictive output for the input data object based at least in part on the plurality of contextual attributes. The computing apparatus can be configured to generate a bias adjusted output for the input data object based at least in part on a comparison between the individualized threshold and the predictive output. The computing apparatus can be configured to provide data indicative of the bias adjusted output.

In yet another embodiment, a computer program product comprising a non-transitory computer-readable storage medium is provided. The non-transitory computer-readable storage medium can include instructions that, when executed by a computing apparatus, cause the computing apparatus to receive an aggregate bias correction function for a machine learning model. The computing apparatus can be caused to generate, using the aggregate bias correction function, an individualized threshold corresponding to an input data object for the machine learning model. The individualized threshold is based at least in part on (i) a plurality of contextual attributes of the input data object and (ii) a plurality of protected attributes of the input data object. The computing apparatus can be caused to generate, using the machine learning model, a predictive output for the input data object based at least in part on the plurality of contextual attributes. The computing apparatus can be caused to generate a bias adjusted output for the input data object based at least in part on a comparison between the individualized threshold and the predictive output. The computing apparatus can be caused to provide data indicative of the bias adjusted output.

BRIEF DESCRIPTION OF THE SEVERAL VIEWS OF THE DRAWINGS

FIG. 2 illustrates an aspect of the subject matter in accordance with one embodiment.

FIG. 3 is a flowchart showing an example of a process for generating feature bias correction functions in accordance with some embodiments discussed herein.

FIG. 5 is a flowchart showing an example of a process for mitigating feature bias in machine learning models in accordance with some embodiments discussed herein.

DETAILED DESCRIPTION

Figure 1:
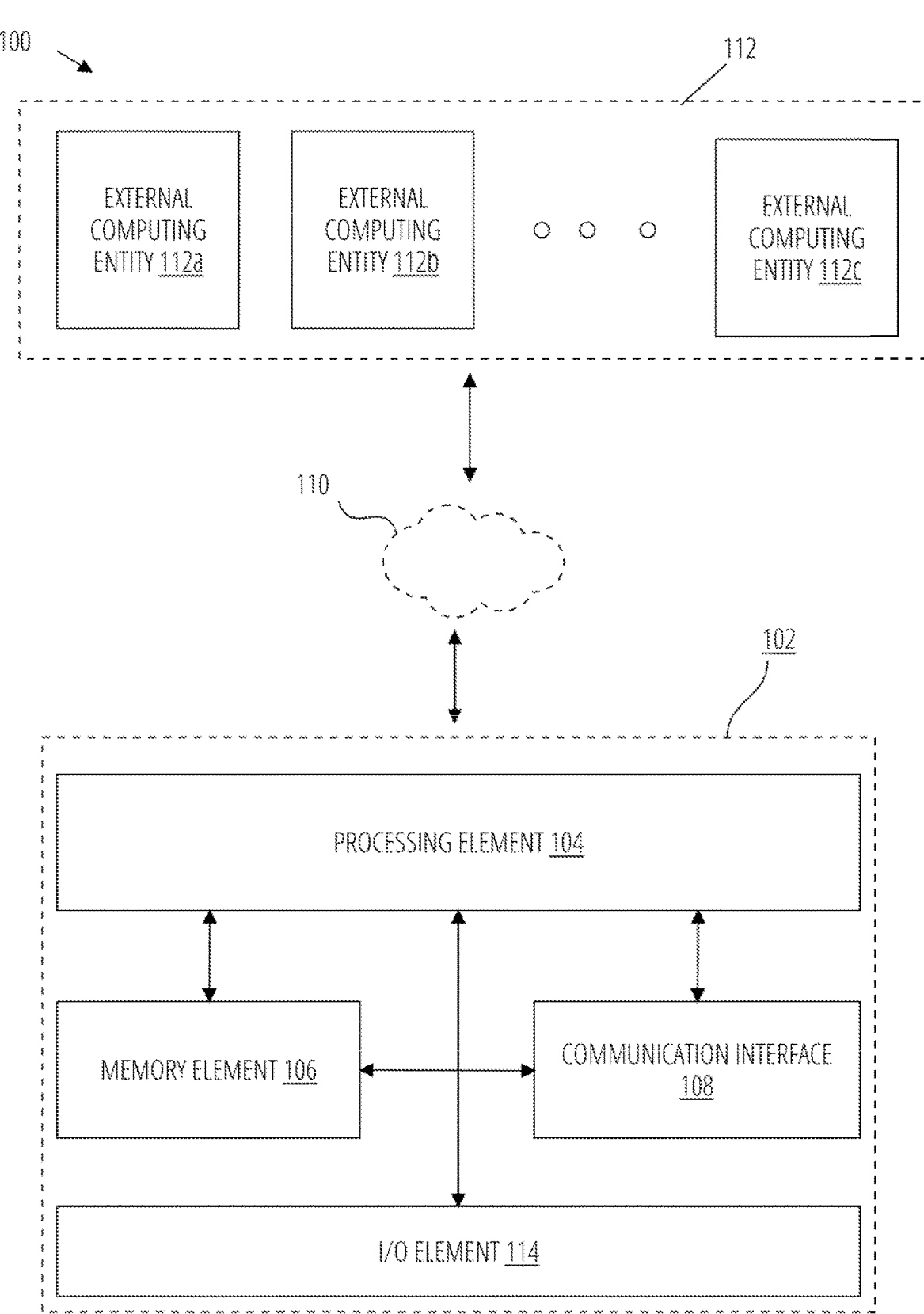
FIG. 1 is a schematic diagram showing an example computing system for generating predictive insights using distributions of non-descriptive identifiers in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout. Moreover, while certain embodiments of the present disclosure are described with reference to predictive data analysis, one of ordinary skill in the art will recognize that the disclosed concepts may be used to perform other types of data analysis.

I. Overview and Technical Advantages

Embodiments of the present disclosure present machine learning and feature bias mitigation approaches that improve machine learning model performance. To do so, the present disclosure provides feature bias mitigation functions and iterative optimization approaches for optimizing the feature bias mitigation functions for use with any machine learning model. The feature bias mitigation functions generate individualized thresholds that are specifically tailored to the individual attributes of an input data object processed by a machine learning model. Meanwhile, the iterative optimization approaches tailor the feature bias correction functions to a specific machine learning model. In this way, the machine learning and feature bias mitigation approaches of the present disclosure overcome the technical challenges of previous feature bias mitigation approaches that lack generality across a variety of machine learning models and fail to account for individual attributes of specific inputs to the machine learning models.

Previous feature bias mitigation approaches may include data augmentation techniques in which training datasets are augmented to rectify nonrepresentative data that may cause bias in a machine learning model. Such techniques may decrease the transparency and explainability of the resulting machine learning model and are susceptible to technical challenges presented by limited availability of data and difficulties in pinpointing the source of bias in the data. Other feature bias mitigation approaches include (i) training techniques which incorporate fairness metrics into the training of the model and (ii) compensation techniques that address bias in a machine learning model by acknowledging the bias, quantifying the bias, and then setting different thresholds for subpopulations that are not well predicted by the machine learning model. Each of these approaches are model specific, lack generality across a variety of machine learning models, and have reduced performance metrics by failing to account for individual attributes of inputs to the machine learning models. Some conventional compensation techniques leverage randomized decision steps in which input data objects within an underrepresented subpopulation are selected at random to improve performance metrics. While these techniques improve performance metrics for a machine learning model, the improvements are synthetic and not reflective of the actual accuracy of the machine learning model. This may lead to unfair decisions and, ultimately, degrade the actual performance of the model.

The present disclosure provides technical improvements to feature bias mitigation approaches for addressing feature bias in machine learning models by replacing subpopulation specific thresholds with more granular input data object specific thresholds that are tailored to the individual attributes of a specific input to a machine learning model. To do so, the present disclosure provides training and optimization techniques for generating feature bias mitigation functions capable of tailoring different thresholds for a machine learning model to the specific inputs of the model. Unlike conventional feature bias mitigation approaches, the feature bias mitigation functions of the present disclosure account for individual differences among input data objects within a population. In this way, the individualized thresholds of the present disclosure may achieve the accuracy of other feature bias mitigation techniques without a randomized component.

Example inventive and technologically advantageous embodiments of the present disclosure include: (a) bias correction functions that (i) generate individualized thresholds with a one-to-one mapping to input data objects, (ii) do not incorporate real valued data in the determination of the individualized thresholds, (iii) do not utilize randomized decision steps, and (b) optimization techniques for tailoring the bias correction functions to a specific machine learning model.

One or more different aspects of the disclosure are described herein using several different example terms.

The term "input data object" may refer to a data entity that describes an input to a machine learning model. The input data object may describe a data entity that is associated with one or more contextual attributes and/or protected attributes. For example, the input data object may include a grouping data structure that links one or more identifiers and/or a plurality of attributes relevant to classification, prediction, and/or other machine learning process. Each attribute may describe a particular characteristic of the input data object. The particular characteristic may be based on the context, the type of machine learning model, and/or the machine learning process.

The machine learning process may include any process that involves a machine learning model. As one example, for purposes of illustration, a machine learning process may include a machine learning diagnostic process that predicts the presence of a disease (e.g., coronavirus, *Streptococcus*, and/or the like) for an individual based on the individual's characteristics. The diagnostic process, for example, may utilize machine learning techniques to predict the presence of a disease in a population of individuals before testing the population for the disease to lower the overall proportional cost of the diagnostic testing. In such a case, the input data object may represent an individual and may include one or more contextual attributes and/or protected attributes for the individual.

The term "contextual attributes" may refer to parameters of an input data object exclusive from the protected attributes. The contextual attributes may include one or more values that are specific to an input data object. The values may include continuous variables (e.g., current/historical blood pressure measurements, and/or the like in a diagnostic context), nonquantitative values (e.g., current/historical diagnosis classifications, and/or the like in diagnostic context), and/or any other data representative of a characteristic of an input data object. In some embodiments, a plurality of contextual attributes may be extracted, stored, and/or generated for the input data object as a contextual tensor, at times referred to as x, including one or more values.

The term "protected attributes" may refer to parameters of an input data object that identify subpopulations within a population of input data objects. The protected attributes may include one or more labels that are specific to an input data object. Each label may identify a subpopulation of input data objects within which the input data object may be grouped. In some embodiments, the labels may identify characteristics that may be associated with potential biases in a machine learning model due to lack of training data, disproportional training datasets, and/or the like. Each label may be based on a particular context. By way of example, in a diagnostic context, a protected attribute may include a label identifying a race, gender, and/or other attribute of an individual that may be underrepresented in a training dataset. In some embodiments, a plurality of protected attributes may be extracted, stored, and/or generated for the input data object as a protected tensor, at times referenced as a, including one or more values that describe each of the protected attributes corresponding to the input data object.

The term "contextual bias correction function" may refer to a data entity that describes parameters, hyper-parameters, and/or defined operations of a trained function, model, and/or the like. The contextual bias correction function, for example, may include one or more tunable parameters configured to output an individualized contextual threshold for an input data object based on the contextual attributes of the input data object. By way of example, the contextual bias correction function, at times referred to as $f_1(x)$, may include a function that determines a first threshold component for an input data object using contextual attributes of the input data object as inputs. The contextual bias correction function may be selected from a library of functions based on its post-optimization performance. In some embodiments, the contextual bias correction function, for example, may include a sigmoid function, a hyperbolic tangent, and/or any continuous function configured to map a plurality of values to an individualized contextual threshold. In some examples, the individualized contextual threshold may include a value between 0 and 1. In some examples, the individualize contextual threshold may be expressed as a component of a continuous function, such as a sigmoid function.

By way of example, the contextual bias correction function may be applied to contextual attributes to map the contextual attributes to a real value between 0 and 1, $f_1(x)$, and/or a component of a continuous function, $f1(x)$, (e.g., sigmoid function, etc.) which may be referred to herein as an individualized contextual threshold. The contextual attributes mapped to the individualized contextual threshold may include one or more different combinations of the contextual attributes of the input data object. It is noted that, if used by the machine learning model, the set of contextual attributes mapped to the individualized contextual threshold is not necessarily the same as those used by the machine learning model to generate a predictive output.

The tunable parameters may include contextual correction parameters that are iteratively optimized for a machine learning model over a plurality of optimizing iterations of an optimization process.

The term "contextual correction parameters" may refer to a plurality of parameters, coefficients, and/or the like that govern the performance of the contextual bias correction function. The contextual correction parameters may depend on the contextual bias correction function. As one example, in some embodiments, the contextual bias correction function may include a sigmoid function and the contextual correction parameters, at times referred to as γ, may include parameters that govern the linear combinations of input features as well as an intercept resulting from a real-valued threshold component.

The contextual correction parameters may be optimized (e.g., trained, and/or the like) over a plurality of optimizing iterations to achieve one or more desirable performance metrics for the machine learning model. By way of example, the contextual correction parameters may be optimized to achieve a particular (e.g., a minimum, and/or the like) cost performance metric. For instance, during the optimization process, the contextual correction parameters may be iteratively modified to minimize an optimal cost performance metric.

The term "protected bias correction function" may refer to a data entity that describes parameters, hyper-parameters, and/or defined operations of a trained function, model, and/or the like. The protected bias correction function, for example, may include one or more tunable parameters configured to output an individualized protection threshold for an input data object based on the protected attributes of the input data object. By way of example, the protected bias correction function, at times referred to as $f_2(a)$, may include a tunable function that determines a second threshold component for an input data object using protected attributes of the input data object as inputs. The protected bias correction function may be selected from a library of functions based on its post-optimization performance. In some embodiments, the protected bias correction function, for example, may include a sigmoid function, a hyperbolic tangent, and/or any continuous function configured to map a plurality of values to an individualized protection threshold. In some examples, the individualized protection threshold may include a value between 0 and 1. In some examples, the individualize protected threshold may be expressed as a component of a continuous function, such as a sigmoid function.

By way of example, the protected bias correction function may be applied to protected attributes to map the protected attributes to a real value between 0 and 1, $f_2(a)$, and/or to a component of a continuous function, $f_2(a)$, (e.g., sigmoid function) referred to herein as an individualized protection threshold. The protected attributes mapped to the individualized protection threshold may include one or more different combinations of the protected attributes of the input data object. It is noted that, if used by the machine learning model, the set of protected attributes mapped to the individualized protection threshold is not necessarily the same as those used by the machine learning model to generate a predictive output.

The tunable parameters may include protected correction parameters that are iteratively optimized for a machine learning model over a plurality of optimizing iterations of an optimization process.

The term "protected correction parameters" may refer to a plurality of parameters, coefficients, and/or the like that govern the performance of the protected bias correction function. The protected correction parameters may depend on the protected bias correction function. As one example, in some embodiments, the protected bias correction function may include a sigmoid function and the protected correction parameters, at times referred to as β, may include parameters that govern the linear combinations of input features as well as an intercept resulting from a real-valued threshold component.

The protected correction parameters may be optimized (e.g., trained, and/or the like) over a plurality of optimizing iterations to achieve one or more desirable performance metrics for the machine learning model. By way of example, the protected correction parameters may be optimized to achieve a particular (e.g., a minimum, and/or the like) cost performance metric. For instance, during the optimization process, the protected correction parameters may be iteratively modified to minimize an optimal cost performance metric.

The term "machine learning model" may refer to a data entity that describes parameters, hyper-parameters, and/or defined operations of a machine learning model (e.g., model including at least one of one or more rule-based layers, one or more layers that depend on trained parameters, etc.). A machine learning model may be trained to perform a predictive, classification, and/or any other machine learning process depending on the use case. The machine learning model may be configured to generate a predictive output for an input data object based on one or more characteristics (e.g., contextual attributes, protected attributes, and/or the like) of the input data object. The predictive output may depend on the context, the type of machine learning model, and/or the machine learning process.

The machine learning model may include one or more of any type of machine learning models including one or more supervised, unsupervised, semi-supervised, and/or reinforcement learning models. In some embodiments, for example, the machine learning model may include a classification model and the predictive output may include a classification for the input data object. By way of example, the machine learning model, referenced at times as the notation h(x), may be configured to generate a predictive output, referenced at times as the notation y, that includes a predicted likelihood of a particular classification. The particular classification may include a binary classification such as, in the diagnostic example, a binary classification indicating whether an individual has a disease. The predictive output may include a value that is on a continuum from zero to one. For instance, in some embodiments, the predictive output may include a classification probability representing the probability that an individual has a particular classification.

In some embodiments, the machine learning model may be trained, using one or more supervisory techniques, to generate predictive outputs based on attributes of an input data object and ground truth labels, y, for the input data object. The machine learning model may be trained to generate the predictive output based on the contextual attributes, x, and/or the protected attributes, a, of the input data object. For example, in some cases, the machine learning model may be trained solely on contextual attributes, x, of the input data object to reduce bias towards protected attributes, a.

A classification for a particular input data object may be determined based on the predictive output and a classification threshold. The classification threshold may define one or more probability ranges that correspond to a particular classification. For example, a classification threshold may be 50% such that a predictive output that is above or equal to 50% may be assigned a first classification (e.g., individual has disease in a diagnostic context) and a predictive output that is at or below 50% may be assigned a second classification (e.g., individual does not have disease in a diagnostic context). When using uniform classification thresholds for taking action (e.g., generating a classification, and/or the like) on the predictive output of the machine learning model, the machine learning model may be trained to perform optimally for an entire population, while performing poorly for subpopulations within the entire population. Such biases may be introduced in a number of different ways including by having a lack of training data, a disproportionate training dataset, and/or the like. As described herein, these biases may be mitigated by generating a modified classification threshold for each individual input data object.

The term "ground truth label" may refer to a data entity that describes a desired output for a machine learning model. The ground truth label may include a prediction of interest for a machine learning model. The ground truth label, for example, may include a historical and/or simulated classification for an input data object. As one example, in a diagnostic context, the ground truth label may represent whether an input data object actually has a disease.

The term "opportunity bound" may refer to a data entity that describes an operational parameter for guiding, evaluating, and/or restricting the optimization of a dynamic function such as the bias correction functions described herein. The opportunity bound, for example, may describe a particular benefit opportunity that should be achieved by the machine learning model. The benefit opportunity may include a true positive rate (TPR) for the machine learning model (e.g., as modified by the aggregate bias correction functions). For instance, in a diagnostic use case, the opportunity bound may indicate how well the machine learning model's predictive outputs result in benefits being received by those that qualify for them. In some embodiments, the opportunity bound may include a TPR for low risk/low cost actions (e.g., coronavirus tests, and/or the like) and/or more complex calculations representative of the balance of risks and benefits in a single measure for high risk/high cost actions (e.g., x-rays, and/or the like). In some embodiments, the opportunity bound, referenced at times as the notation ($\alpha$), may include a minimum TPR when comparing ground truth labels, y, to classifications, $\hat{y}$, generated based on predictive outputs of the machine learning model.

The term "bias bound" may refer to a data entity that describes an operational parameter for guiding, evaluating, and/or restricting the optimization of a dynamic function such as the bias correction functions described herein. The bias bound, for example, may describe a particular measure of bias that should be achieved by the machine learning model. The measure of bias may represent variations in the relative performance of the machine learning model among different subpopulations within a population of input data objects. The relative performance of the machine learning model may be measured using one or more different performance metrics. A measure of bias may be determined based on a disparity between performance metrics generated for each subpopulation within the population of input data objects. In some embodiments, the measure of bias may include the absolute value differences in the TPR among subpopulations. In some embodiments, the bias bound, referenced at times as the notation ($\varepsilon$), may include a maximum allowed measure of bias.

II. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a non-transitory computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a non-transitory computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

III. Example System Framework

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more prediction techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more prediction techniques described herein.

The external computing entities 112a-c, for example, may include and/or be associated with one or more data centers and/or data processing entities. The data centers, for example, may be associated with one or more data repositories storing data that can, in some circumstances, be processed by the predictive computing entity 102. By way of example, the external computing entities 112a-c may be associated with a plurality of predictive entities associated with a machine learning process. The external computing entities 112a-c, for example, may generate, record, store, and/or maintain historical and/or simulated data associated with the machine learning process. In some embodiments, historical and/or simulated data may include at least a portion of training data leveraged to train a machine learning model. In addition, or alternatively, the external computing entities 112a-c may include one or more data processing entities that may receive, store, and/or have access to one or more machine learning models configured to perform one or more machine learning processes. In such a case, the external computing entities 112a-c may provide access to the machine learning models and/or augment the machine learning models with one or more bias mitigation functionalities described herein.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the predictive computing entity 102 with the assistance of the processing element 104.

As indicated, in one embodiment, the predictive computing entity 102 may also include one or more communication interfaces 108 for communicating with various computing entities such as the external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
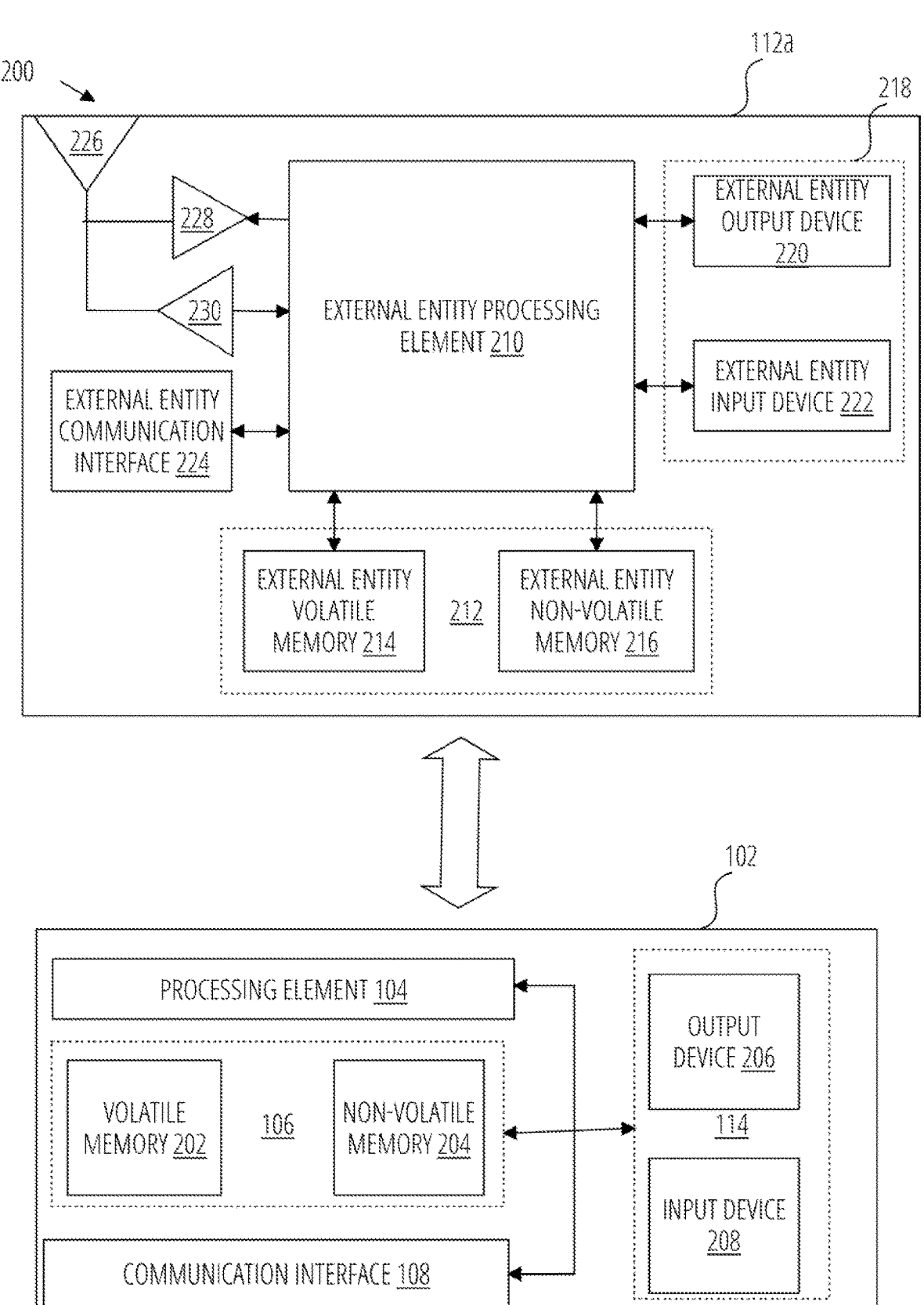
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112a of the computing system 100. The predictive computing entity 102 and/or the external computing entity 112a may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry such as a communication bus, and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The memory element 106 may include non-volatile memory 204 (also referred to as non-volatile storage, memory, memory storage, memory circuitry and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as in a particular directory, folder, or library. Software components may be static (e.g., pre-established, or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry such as a communication bus, and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitries. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above regarding the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

IV. Example System Operations

FIG. 3 is a flowchart showing an example of a process 300 for optimizing feature bias correction functions in accordance with some embodiments discussed herein. The process 300 leverages new bias mitigation techniques to generate bias correction functions that are specifically tailored to a machine learning model. The bias mitigation techniques may be implemented by one or more computing devices, entities, and/or systems described herein. For example, via the various steps/operations of the process 300, the computing system 100 may leverage the bias mitigation techniques to overcome the various limitations with conventional bias mitigation processes that (i) lack generality across a number of different machine learning models and/or (ii) fail to account for individual differences unique to input data objects processed by the machine learning models.

FIG. 3 illustrates an example process 300 for explanatory purposes. Although the example process 300 depicts a particular sequence of steps/operations, the sequence may be altered without departing from the scope of the present disclosure. For example, some of the steps/operations depicted may be performed in parallel or in a different sequence that does not materially impact the function of the process 300. In other examples, different components of an example device or system that implements the process 300 may perform functions at substantially the same time or in a specific sequence.

According to some examples, the process 300 includes, at step/operation 302, generating a contextual bias correction function. For example, the computing system 100 may generate the contextual bias correction function. The contextual bias correction function may include a plurality of contextual correction parameters configured to output an individualized contextual threshold for an input data object of the machine learning model based on a plurality of contextual attributes of the input data object.

An input data object, for example, may refer to a data entity that describes an input to a machine learning model. The input data object may describe a data entity that is associated with one or more contextual attributes and/or protected attributes. For example, the input data object may include a grouping data structure that links one or more identifiers and/or a plurality of attributes relevant to a classification, prediction, and/or other machine learning process. Each attribute may describe a particular characteristic of the input data object. The particular characteristic may be based on the context, the type of machine learning model, and/or the machine learning process.

The machine learning process may include any process that involves a machine learning model. As one example, for purposes of illustration, a machine learning process may include a machine learning diagnostic process that predicts the presence of a disease (e.g., coronavirus, *Streptococcus*, and/or the like) for an individual based on the individual's characteristics. The diagnostic process, for example, may utilize machine learning techniques to predict the presence of a disease in a population of individuals before testing the population for the disease to lower the overall proportional cost of the diagnostic testing. In such a case, the input data object may represent an individual and may include one or more contextual attributes and/or protected attributes for the individual.

The contextual attributes may include parameters of an input data object that are exclusive from the protected attributes. The contextual attributes, for example, may include one or more values that are specific to an input data object. The values may include continuous variables (e.g., current/historical blood pressure measurements, and/or the like in a diagnostic context), nonquantitative values (e.g., current/historical diagnosis classifications, and/or the like in diagnostic context), and/or any other data representative of a characteristic of an input data object. In some embodiments, a plurality of contextual attributes may be extracted, stored, and/or generated for the input data object as a contextual tensor, at times referenced as x, including one or more values.

The contextual bias correction function may include a data entity that describes parameters, hyper-parameters, and/or defined operations of a trained function, model, and/or the like. The contextual bias correction function, for example, may include one or more tunable parameters configured to output the individualized contextual threshold for the input data object based on the contextual attributes of the input data object. By way of example, the contextual bias correction function, at times referred to as $f_1$, may include a function that determines a first threshold component for the input data object using contextual attributes of the input data object as inputs. The contextual bias correction function may be selected from a library of functions based on its post-optimization performance. In some embodiments, the contextual bias correction function, for example, may include a sigmoid function, a hyperbolic tangent, and/or any continuous function configured to map a plurality of values to an individualized contextual threshold. In some examples, the individualized contextual threshold may include a value between 0 and 1. In some examples, the individualize contextual threshold may be expressed as a component of a continuous function, such as a sigmoid function.

By way of example, the contextual bias correction function may be applied to contextual attributes to map the contextual attributes to a real value between 0 and 1, $f_1(x)$, and/or to a component of a continuous function, $f1(x)$, (e.g., sigmoid function) referred to herein as an individualized protection threshold. The contextual attributes mapped to the individualized contextual threshold may include one or more different combinations of the contextual attributes of the input data object. It is noted that, if used by the machine learning model, the set of contextual attributes mapped to the individualized contextual threshold is not necessarily the same as those used by the machine learning model to generate a predictive output.

The tunable parameters may include contextual correction parameters that are iteratively optimized for a machine learning model over a plurality of optimizing iterations of an optimization process.

The contextual correction parameters, for example, may include a plurality of parameters, coefficients, and/or the like that govern the performance of the contextual bias correction function. The contextual correction parameters, at times referred to as γ, may depend on the contextual bias correction function. As one example, in some embodiments, the contextual bias correction function may include a sigmoid function and the contextual correction parameters may include parameters that govern the linear combinations of input features as well as an intercept resulting from a real-valued threshold component.

According to some examples, the process 300 includes, at step/operation 304, generating a protected bias correction function for the machine learning model. For example, the computing system 100 may generate the protected bias correction function for the machine learning model. The protected bias correction function may include a plurality of protected correction parameters configured to output an individualized protection threshold for the input data object based on a plurality of protected attributes of the input data object.

The protected attributes may include parameters of an input data object that identify subpopulations within a population of input data objects. The protected attributes may include one or more labels that are specific to an input data object. Each label may identify a subpopulation of input data objects within which the input data object may be grouped. In some embodiments, the labels may identify characteristics that may be associated with potential biases in a machine learning model due to lack of training data, disproportional training datasets, and/or the like. Each label may be based on a particular context. By way of example, in a diagnostic context, a protected attribute may include a label identifying a race, gender, and/or other attribute of an individual that may be underrepresented in a training dataset. In some embodiments, a plurality of protected attributes may be extracted, stored, and/or generated for the input data object as a protected tensor, at times referenced as a, including one or more values that describe each of the protected attributes corresponding to the input data object.

The protected bias correction function may include a data entity that describes parameters, hyper-parameters, and/or defined operations of a trained function, model, and/or the like. The protected bias correction function, for example, may include one or more tunable parameters configured to output an individualized protection threshold for an input data object based on the protected attributes of the input data object. By way of example, the protected bias correction function, at times referred to as $f_2$, may include a tunable function that determines a second threshold component for an input data object using protected attributes of the input data object as inputs. The protected bias correction function may be selected from a library of functions based on its post-optimization performance. In some embodiments, the protected bias correction function, for example, may include a sigmoid function, a hyperbolic tangent, and/or any continuous function configured to map a plurality of values to an individualized protection threshold including a value between 0 and 1.

By way of example, the protected bias correction function may be applied to protected attributes to map the protected attributes to a real value between 0 and 1, $f_2(a)$, and/or to a component of a continuous function, $f_2(a)$, (e.g., sigmoid function, etc.) referred to herein as an individualized protection threshold. The protected attributes mapped to the individualized protection threshold may include one or more different combinations of the protected attributes of the input data object. It is noted that, if used by the machine learning model, the set of protected attributes mapped to the individualized protection threshold is not necessarily the same as those used by the machine learning model to generate a predictive output.

The tunable parameters may include protected correction parameters that are iteratively optimized for a machine learning model over a plurality of optimizing iterations of an optimization process.

The protected correction parameters, for example, may include a plurality of parameters, coefficients, and/or the like that govern the performance of the protected bias correction function. The protected correction parameters may depend on the protected bias correction function. As one example, in some embodiments, the protected bias correction function may include a sigmoid function and the protected correction parameters, at times referred to as β, may include parameters that govern the linear combinations of input features as well as an intercept resulting from a real-valued threshold component.

In some embodiments, the contextual bias correction function and/or the protected bias correction function may be generated by iteratively modifying the plurality of contextual correction parameters and/or protected correction parameters, respectively, over a plurality of optimizing iterations.

The contextual correction parameters, for example, may be optimized (e.g., trained, and/or the like) over a plurality of optimizing iterations to achieve one or more desirable performance metrics for the machine learning model. By way of example, the contextual correction parameters may be optimized to achieve a particular (e.g., a minimum, and/or the like) cost performance metric. For instance, during the optimization process, the contextual correction parameters may be iteratively modified to minimize an optimal cost performance metric.

In addition, or alternatively, the protected correction parameters may be optimized (e.g., trained, and/or the like) over a plurality of optimizing iterations to achieve one or more desirable performance metrics for the machine learning model. By way of example, the protected correction parameters may be optimized to achieve a particular (e.g., a minimum, and/or the like) cost performance metric. For instance, during the optimization process, the protected correction parameters may be iteratively modified to minimize an optimal cost performance metric.

Figure 4:
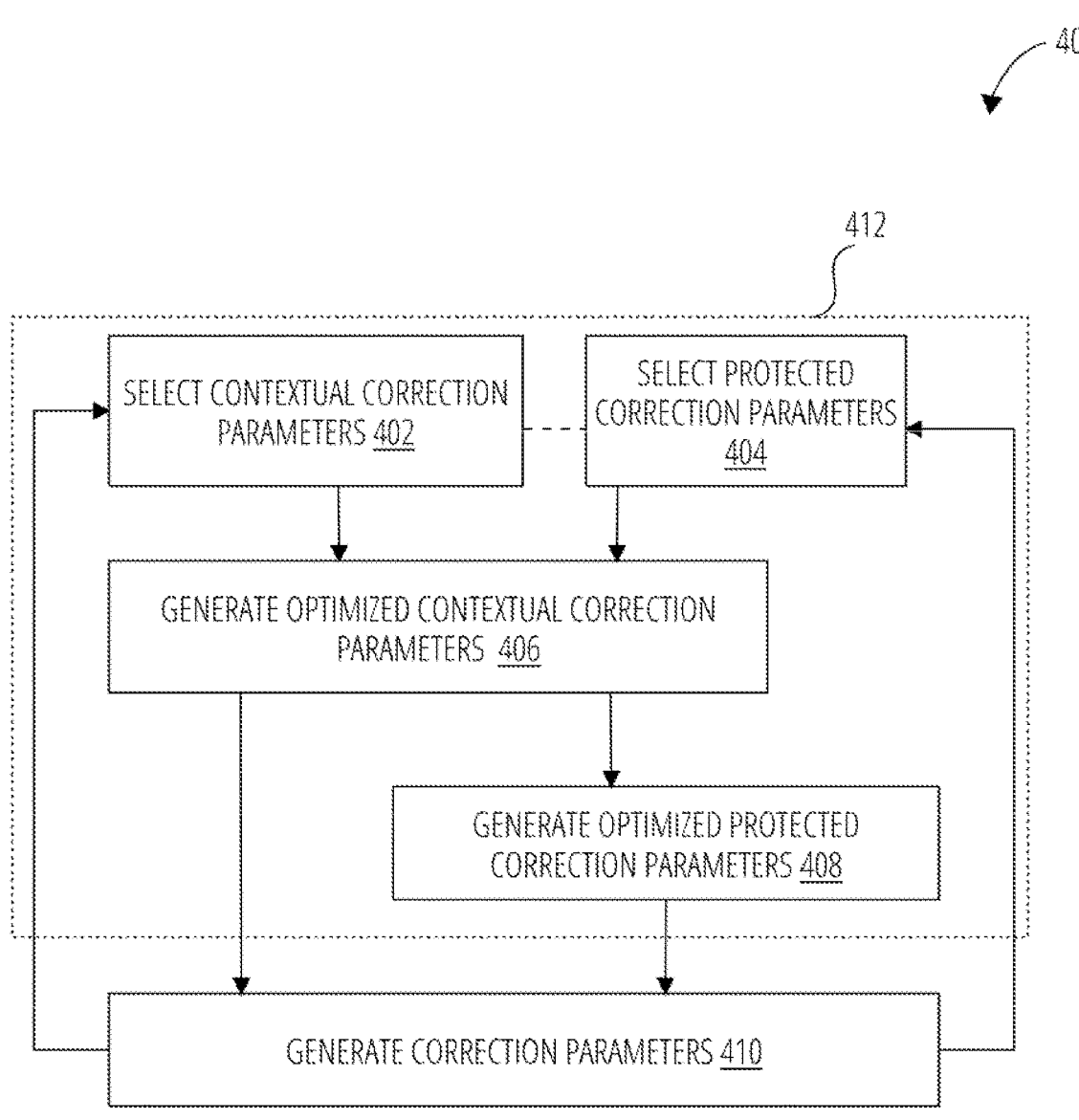
FIG. 4 is a flowchart showing an example of a process for iteratively modifying parameters of feature bias correction functions in accordance with some embodiments discussed herein.

FIG. 4 is a flowchart showing an example of a process 400 for iteratively modifying parameters of feature bias correction functions in accordance with some embodiments discussed herein. The process 400 leverages iterative optimization techniques to optimize parameters of feature bias correction functions for a specific use case. The iterative optimization techniques may be implemented by one or more computing devices, entities, and/or systems described herein. For example, via the various steps/operations of the process 400, the computing system 100 may leverage the iterative optimization techniques to overcome the various limitations with conventional bias mitigation processes that (i) lack generality across a number of different machine learning models and/or (ii) fail to account for individual differences unique to input data objects processed by the machine learning models.

FIG. 4 illustrates an example process 400 for explanatory purposes. Although the example process 400 depicts a particular sequence of steps/operations, the sequence may be altered without departing from the scope of the present disclosure. For example, some of the steps/operations depicted may be performed in parallel or in a different sequence that does not materially impact the function of the process 400. In other examples, different components of an example device or system that implements the process 400 may perform functions at substantially the same time or in a specific sequence.

The process 400 may describe one of a plurality of verification iterations for optimizing (e.g., training, and/or the like) feature bias correction functions such as the contextual bias correction function and/or the protected bias correction function to optimize the functions for use with a particular machine learning model. Each verification iteration may include a plurality of optimizing iterations in which a parameter set is generated that includes a respective plurality of contextual correction parameters and a respective plurality of protected correction parameters optimized for use with the machine learning model.

The machine learning model, for example, may include a data entity that describes parameters, hyper-parameters, and/or defined operations of a machine learning model (e.g., model including at least one of one or more rule-based layers, one or more layers that depend on trained parameters, etc.). The machine learning model may be trained to perform a predictive, classification, and/or any other machine learning process depending on the use case. The machine learning model may be configured to generate a predictive output for an input data object based on one or more characteristics (e.g., contextual attributes, protected attributes, and/or the like) of the input data object. The predictive output may depend on the context, the type of machine learning model, and/or the machine learning process.

The machine learning model may include one or more of any type of machine learning models including one or more supervised, unsupervised, semi-supervised, and/or reinforcement learning models. In some embodiments, for example, the machine learning model may include a classification model and the predictive output may include a classification for the input data object. By way of example, the machine learning model, referenced at times as the notation h(x), may be configured to generate a predictive output, referenced at times as the notation ŷ, that includes a predicted likelihood of a particular classification. The particular classification may include a binary classification such as, in the diagnostic example, a binary classification indicating whether an individual has a disease. The predictive output may include a value that is on a continuum from zero to one. For instance, in some embodiments, the predictive output may include a classification probability representing the probability that an individual has a particular classification.

In some embodiments, the machine learning model may be trained, using one or more supervisory techniques, to generate predictive outputs based on attributes of an input data object and ground truth labels, y, for the input data object. The machine learning model may be trained to generate the predictive output based on the contextual attributes, x, and/or the protected attributes, a, of the input data object. For example, in some cases, the machine learning model may be trained solely on contextual attributes, x, of the input data object to reduce bias towards protected attributes, a.

A classification for a particular input data object may be determined based on the predictive output and a classification threshold. The classification threshold may define one or more probability ranges that correspond to a particular classification. For example, a classification threshold may be 50% such that a predictive output that is above or equal to 50% may be assigned a first classification (e.g., individual has disease in a diagnostic context) and a predictive output that is at or below 50% may be assigned a second classification (e.g., individual does not have disease in a diagnostic context). When using uniform classification thresholds for taking action (e.g., generating a classification, and/or the like) on the predictive output of the machine learning model, the machine learning model may be trained to perform optimally for an entire population, while performing poorly for subpopulations within the entire population. Such biases may be introduced in a number of different ways including by having a lack of training data, a disproportionate training dataset, and/or the like. Through a plurality of optimizing iterations the contextual bias correction function and/or the protected bias correction function may be optimized to mitigate these biases by generating a modified classification threshold for each individual input data object.

The process 400 includes one example of training the contextual bias correction function with contextual attributes, $f_1(x)$, and the protected bias correction function with protected attributes, $f_2(a)$, on a training dataset that includes a plurality of input data objects, each including corresponding contextual attributes, x, protected attributes, y, and ground truth labels, a. The ground truth labels, for example, may include a desired output for the machine learning model. Each ground truth label may include a prediction of interest for a machine learning model. The ground truth label, for example, may include a historical and/or simulated classification for an input data object. As one example, in a diagnostic context, the ground truth label may represent whether an input data object actually has a disease. The contextual correction parameters, γ, and the protected correction parameters, β, may be trained as a function of the contextual attributes, x, protected attributes, y, and ground truth labels, a, of the training dataset.

According to some examples, the process 400 includes, at step/operation 402, selecting a plurality of initial contextual correction parameters for the contextual bias correction function. For example, the computing system 100 may select the plurality of initial contextual correction parameters for the contextual bias correction function. According to some examples, the process 400 includes, at step/operation 404, selecting a plurality of initial protected correction parameters for the protected bias correction function. For example, the computing system 100 may select the plurality of initial protected correction parameters for the protected bias correction function. The initial contextual correction parameters and/or the initial protected correction parameters may each include a plurality of parameters selected for a particular optimizing iteration 412 of a plurality of optimizing iterations. The initial parameters may include starting points for the contextual correction parameters, γ, and the protected correction parameters, β.

The initial parameters may be based on the optimizing iteration 412. For example, in the event that the optimizing iteration 412 is a first iteration of the plurality of optimizing iterations, the plurality of initial contextual correction parameters and/or the plurality of initial protected correction parameters may be randomly sampled from a parameter space. In this way, the starting points for the iterative process may be selected at random. In some embodiments, the initial parameters may be sampled randomly uniformly during restarts of a verification iteration to explore a large swath of starting values within the parameter space.

In addition, or alternatively, the optimizing iteration 412 may include a second iteration that is subsequent to the first iteration of the plurality of optimizing iterations. In such a case, the plurality of initial contextual correction parameters may include a plurality of previous optimized contextual correction parameters corresponding to (e.g., generated during) an iteration (e.g., the first iteration) immediately preceding the second iteration. In addition, or alternatively, the plurality of initial protected correction parameters may include a plurality of previous optimized protected correction parameters corresponding to (e.g., generated during) an iteration (e.g., the first iteration) immediately preceding the second iteration. In this way, the contextual correction parameters and/or the protected correction parameters for each of the correction functions may be iteratively optimized during a single verification iteration by feeding optimized parameters from previous optimizing iterations to subsequent optimizing iterations of the verification iteration.

According to some examples, the process 400 includes, at step/operation 406, generating a plurality of optimized contextual correction parameters for the optimizing iteration 412. For example, the computing system 100 may generate the plurality of optimized contextual correction parameters for the optimizing iteration 412. In some embodiments, the plurality of contextual correction parameters may be based on the plurality of optimized contextual correction parameters. By way of example, the optimizing iteration 412 may be one of a plurality of optimization iterations in an iterative optimization process of a verification iteration. The plurality of contextual correction parameters may include the optimized contextual correction parameters from an optimizing iteration 412 that achieves a desired result (e.g., highest performance, reliable performance, and/or the like).

For a respective optimizing iteration 412, the plurality of optimized contextual correction parameters may be generated based on at least one of (i) the plurality of initial contextual correction parameters, (ii) a plurality of training outputs for the machine learning model, and (iii) a plurality of ground truth labels for the machine learning model. The training outputs for the machine learning model may include a plurality of predicted classifications generated by the machine learning model based on predictive outputs of the machine learning model and a classification threshold generated using the plurality of initial contextual correction parameters and the plurality of initial protected correction parameters.

For example, the computing system 100 may generate a plurality of training outputs for the machine learning model based on (i) a plurality of historical predictive outputs for the machine learning model, (ii) the one or more initial contextual correction parameters, and (iii) the one or more initial protected correction parameters. Each historical predictive output may include a probability of a classification for a historical input data object. The computing system 100 may generate a particular individualized protection threshold and/or individualized contextual threshold for the historical input data object corresponding to a historical predictive output based on the plurality of initial contextual correction parameters and/or initial protected correction parameters.

For instance, the computing system 100 may generate a particular individualized contextual threshold corresponding to the historical input data object by applying the contextual bias correction function (e.g., defined by the initial contextual correction parameters) to contextual attributes of the historical input data object. In addition, or alternatively, the computing system 100 may generate a particular individualized protection threshold corresponding to the historical input data object by applying the protected bias correction function (e.g., defined by the initial protected correction parameters) to protected attributes of the historical input data object.

The computing system 100 may generate a training output for the historical input data object by comparing the historical predictive output to the particular individualized contextual threshold and/or the particular individualized protection threshold. By way of example, the particular individualized contextual threshold and/or the particular individualized protection threshold for the optimizing iteration 412 may be combined to generate an optimizing iteration specific aggregate bias correction threshold for the historical input data object. The training output for the historical input data object may include (i) a first classification in the event that the historical predictive output satisfies (e.g., exceeds or is equal to) the optimizing iteration specific aggregate bias correction threshold and/or (ii) a second classification in the event that the historical predictive output does not satisfy (e.g., is lower than or equal to) the optimizing iteration specific aggregate bias correction threshold. In this manner, a respective plurality of different training outputs may be generated for each historical input data object at each respective optimizing iteration of a plurality of optimizing iterations based on the initial protected correction parameters and/or initial contextual correction parameters of the respective optimizing iteration.

The plurality of training outputs for the optimizing iteration 412 may be compared to the plurality of ground truth labels to generate one or more performance metrics for the machine learning model. By way of example, the training outputs may be compared to the ground truth labels to generate a confusion matrix from which may be calculated, among others, a TPR, false positive rate (FPR), and/or the like. As one example, the computing system 100 may determine an FPR for the machine learning model based on a comparison between the training outputs and the ground truth labels. In addition, or alternatively, the computing system 100 may determine a TPR for the machine learning model based on a comparison between the training outputs and the ground truth labels. The computing system 100 may generate the plurality of optimized contextual correction parameters based on the one or more performance metrics. By way of example, in some embodiments, the computing system 100 may generate the plurality of optimized contextual correction parameters by modifying the plurality of initial contextual correction parameters to reduce the FPR for the machine learning model.

The optimized contextual correction parameters, for example, may be optimized using one or more different optimization techniques in which the contextual correction parameters, $\gamma$, may be varied for a particular set of protected correction parameters, $\beta$, to find a local minimum for a cost performance metric (e.g., an FPR) such that the combination of contextual correction parameters, $\gamma$, and protected correction parameters, $\beta$, do not violate one or more parameter bounds. The one or more parameter bounds, for example, may include an opportunity bound, $BP(\alpha)$, and/or a bias bound, bias ($\varepsilon$). In some embodiments, an additional filtering step may be leveraged to allow for additional relaxation. The optimized contextual correction parameters may be optimized by minimizing the cost performance metric subject to parameter bounds. In this way, optimized contextual correction parameters that violate any of the parameter bounds will not be admitted.

By way of example, the plurality of contextual correction parameters and the plurality of protected correction parameters may be based on one or more parameter bounds. The one or more parameter bounds may include an opportunity bound indicative of a minimum TPR between a plurality of training outputs and a plurality of ground truth labels of the machine learning model. In addition, or alternatively, the one or more parameter bounds may include a bias bound indicative of a maximum disparity measure between a plurality of training outputs of the machine learning model.

The opportunity bound, for example, may include a data entity that describes an operational parameter for guiding, evaluating, and/or restricting the optimization of a dynamic function such as the contextual bias correction functions and/or protected bias correction functions. The opportunity bound, for example, may describe a particular benefit opportunity that should be achieved by the machine learning model. The benefit opportunity may include a TPR for the machine learning model (e.g., as modified by the bias correction functions). For instance, in a diagnostic use case, the opportunity bound may indicate how well the machine learning model's predictive outputs result in benefits being received by those that qualify for them. In some embodiments, the opportunity bound may include a TPR for low risk/low cost actions (e.g., coronavirus tests, and/or the like)

and/or more complex calculations representative of the balance of risks and benefits in a single measure for high risk/high cost actions (e.g., x-rays, and/or the like). In some embodiments, the opportunity bound, referenced at times as the notation $(\alpha)$, may include a minimum TPR when comparing ground truth labels, y, to training predictive outputs, $\hat{y}$, generated based on predictive outputs of the machine learning model.

The bias bound may include a data entity that describes an operational parameter for guiding, evaluating, and/or restricting the optimization of a dynamic function such as the contextual bias correction functions and/or protected bias correction functions. The bias bound, for example, may describe a particular measure of bias that should be achieved by the machine learning model. The measure of bias may represent variations in the relative performance of the machine learning model among different subpopulations within a population of input data objects. The relative performance of the machine learning model may be measured using one or more different performance metrics. A measure of bias may be determined based on a disparity between performance metrics generated for each subpopulation within the population of input data objects. In some embodiments, the measure of bias may include the absolute value differences in the TPR among subpopulations. In some embodiments, the bias bound, referenced at times as the notation $(\varepsilon)$, may include a maximum allowed measure of bias.

According to some examples, the process 400 includes, at step/operation 408, generating the plurality of optimized protected correction parameters for the optimizing iteration 412. For example, the computing system 100 may generate the plurality of optimized protected correction parameters for the optimizing iteration 412. In some embodiments, the plurality of protected correction parameters may be based on the plurality of optimized protected correction parameters. By way of example, the optimizing iteration 412 may be one of a plurality of optimization iterations in an iterative optimization process of a verification iteration. The plurality of protected correction parameters may include the optimized protected correction parameters from an optimizing iteration 412 that achieves a desired result (e.g., highest performance, reliable performance, and/or the like).

For a respective optimizing iteration, the plurality of optimized protected correction parameters may be generated based on at least one of (i) the plurality of initial protected correction parameters, (ii) a plurality of training outputs for the machine learning model, and (iii) the plurality of ground truth labels for the machine learning model. The training outputs for the machine learning model may include a plurality of predicted classifications generated by the machine learning model based on predictive outputs of the machine learning model and a classification threshold generated using the plurality of optimized contextual correction parameters (e.g., generated in step/operation 406) and the plurality of initial protected correction parameters.

For example, the computing system 100 may generate a plurality of training outputs for the machine learning model based on (i) the plurality of historical predictive outputs for the machine learning model, (ii) the plurality of optimized protected correction parameters, and (iii) the plurality of initial protected correction parameters. Each historical predictive output may include a probability of a classification for a historical input data object. The computing system 100 may generate a particular individualized protection threshold and/or individualized contextual threshold for the historical input data object corresponding to a historical predictive output based on the plurality of optimized contextual correction parameters and/or initial protected correction parameters.

For instance, the computing system 100 may generate a particular individualized contextual threshold corresponding to the historical input data object by applying the contextual bias correction function (e.g., defined by the optimized contextual correction parameters) to contextual attributes of the historical input data object. In addition, or alternatively, the computing system 100 may generate a particular individualized protection threshold corresponding to the historical input data object by applying the protected bias correction function (e.g., defined by the initial protected correction parameters) to protected attributes of the historical input data object.

As described herein, using the particular individualized contextual threshold and the particular individualized protection threshold, the computing system 100 may generate a plurality of different training outputs for each historical input data object at each respective optimizing iteration of a plurality of optimizing iterations based on the optimized contextual correction parameters and/or initial protected correction parameters of the respective optimizing iteration.

The plurality of training outputs for the optimizing iteration 412 may be compared to the plurality of ground truth labels to generate one or more performance metrics for the machine learning model as described herein. The computing system 100 may generate the plurality of optimized protected correction parameters by modifying the plurality of initial protected correction parameters to reduce an FPR (and/or any other performance metric) for the machine learning model.

The computing system 100 may leverage the local minimum cost performance metric obtained, using the optimized contextual correction parameters, $\gamma$, obtained in a previous step of an optimizing iteration and one or more different optimization techniques to generate the optimized protected correction parameters. For instance, the optimization techniques may include varying the initial protected correction parameters, $\beta$, to find a local minimum for the cost performance metric such that the combination of contextual correction parameters, $\gamma$, and protected correction parameters, $\beta$, do not violate parameter bounds such as opportunity and/or bias bounds.

In this manner, at each optimizing iteration of a plurality of optimizing iterations the computing system 100 may first optimize the plurality of contextual correction parameters for a contextual bias correction function and then, using the optimized contextual correction parameters, optimize the protected correction parameters for the protected bias correction function. The order of optimization operations is provided as one example embodiment. In other embodiments, the computing system 100 may first optimize the plurality of protected correction parameters for a protected bias correction function and then, using the optimized protected correction parameters, optimize the contextual correction parameters for the contextual bias correction function.

According to some examples, the process 400 includes, at step/operation 410, generating the correction parameters. For example, the computing system 100 may generate a plurality of correction parameters based on the optimized contextual correction parameters and/or the optimized protected correction parameters. In some embodiments, step/operations 402-408 may include one optimizing iteration 412 of a plurality of optimizing iterations. The step/operations 402-408 may be repeated to perform a second optimizing iteration. Each second optimizing iteration may utilize the optimized protected correction parameters and/or optimized contextual correction parameters generated in a preceding iteration. In some embodiments, the plurality of optimizing iterations may include a fixed number of iterations to account for the interaction between the protected bias correction function and the contextual bias correction function. In addition, or alternatively, the plurality of optimizing iterations may include a dynamic number of iterations based on a threshold performance metric and/or the like. The optimized contextual correction parameters and/or the optimized protected correction parameters may be stored after the plurality of optimizing iterations.

In some embodiments, the process 400 may be repeated for one or more verification iterations. During each verification iteration, an iteration specific set of optimized contextual correction parameters and/or optimized protected correction parameters may be generated and stored in a corrective function datastore. Each verification iteration may include different starting values for the contextual correction parameters and/or protected correction parameters that may result in different performance metrics achieved by an iteration specific set of optimized contextual correction parameters and/or optimized protected correction parameters. In this way, the corrective function datastore may include a plurality of parameter sets in which each parameter set may include a respective plurality of contextual correction parameters and a respective plurality of protected correction parameters that correspond to a respective performance metric for the machine learning model.

In some embodiments, the computing system 100 may select a verified parameter set from the corrective function datastore based on the respective performance metric. By way of example, the verified parameter set may include a respective plurality of contextual correction parameters and a respective plurality of protected correction parameters that yielded the lowest cost performance metric without violating the parameter bounds (e.g., opportunity bound, bias bound, and/or the like). In some embodiments, a confidence score may be assigned to the verified parameter set based on the respective performance metric. The confidence score, for example, may be indicative of a number of verified parameter sets associated with the same respective performance metric. By way of example, a high confidence score may be assigned to a verified parameter set associated with a respective performance metric that is achieved by a large number of the plurality of parameter sets. A low confidence score may be assigned to a verified parameter set associated with a respective performance metric that is achieved by a low number of the plurality of parameter sets.

Turning back to FIG. 3, according to some examples, the process 300 includes, at step/operation 306, generating an aggregate bias correction function for the machine learning model based on the contextual bias correction function and the protected bias correction function. For example, the computing system 100 may generate the aggregate bias correction function for the machine learning model based on the contextual bias correction function and the protected bias correction function. The aggregate bias correction function may be configured to output an aggregate bias correction threshold based on the plurality of protected attributes and the plurality of contextual attributes of an input data object. In some embodiments, the aggregate bias correction threshold may be the product of the individualized contextual threshold and the individualized protection threshold.

The aggregate bias correction function may include a data entity that describes parameters, hyper-parameters, and/or defined operations of a trained function, model, and/or the like. The aggregate bias correction function may include a combination of one or more correction functions. By way of example, the aggregate bias correction function may include an aggregation of the contextual bias correction function and the protected bias correction function. As one example, the aggregate bias correction function may combine the contextual bias correction function and the protected bias correction function by generating a product of the two functions, $f(x,a)=f_1(x) \, f_2(a)$. In addition, or alternatively, the aggregate bias correction function may include other combinations such as an arithmetic mean, $f(x,a)=(f_1(x)+f_2(a))/2$, and/or any other type of combination (weighted, geometric, or harmonic, and/or the like). In some examples, the aggregate bias correction function may include a composition of a sigmoid function with a sum of linear functions of the contextual attributes and the protected attributes such that, $f(x,a)=\text{sigmoid}(f1(x)+f2\,(a))$.

According to some examples, the process 300 includes, at step/operation 308, providing data indicative of the aggregate bias correction function for the machine learning model. For example, the computing system 100 may provide data indicative of the aggregate bias correction function for the machine learning model.

The data indicative of the aggregate bias correction function for the machine learning model may include a combination of the contextual correction parameters, $\gamma$, protected correction parameters, $\beta$, that have been optimized to satisfy one or more performance metric such as by minimizing a cost performance metric while complying with the constraint bounds (e.g., opportunity bounds, bias bounds, and/or the like). The contextual correction parameters, $\gamma$, and the protected correction parameters, $\beta$, may be used in functions in contextual bias correction function $f_1(x)$ and protected bias correction function $f_2(a)$, respectively. The functions $f1(x)$ and/or $f_2(a)$ may be combined to generate the aggregate bias correction function that may yield an individual aggregate bias correction threshold, $f(x,a)$ (e.g., $f1(x)f2(a)$), for an input data object that is tailored to the specific attributes (contextual attributes, protected attributes, and/or the like) of the input data object. The resulting aggregate bias correction threshold may be applied to a predictive output, h(x), for the input data object to generate a bias adjusted output for the input data object. By tailoring each aggregate bias correction threshold to the specific characteristics of each input data object, predictive outputs generated for a population of input data objects may be more accurate and exhibit less bias than previous bias mitigation techniques that apply uniform thresholds.

The data indicative of the aggregate bias correction function may be stored in association with the machine learning model. In some embodiments, the aggregate bias correction function, for example, may include a wrapper data structure that preprocesses input data objects input to the machine learning model and postprocesses predictive outputs generated by the machine learning model to model accuracy. As one example, data indicative of the aggregate bias correction function may be provided to a third party for use with a machine learning model for which the aggregate bias correction function is specifically tailored.

FIG. 5 is a flowchart showing an example of a process 500 for mitigating feature bias in machine learning models in accordance with some embodiments discussed herein. The process 500 leverages feature bias correction functions to specifically tailor bias classification thresholds to the individual attributes of an input to a machine learning model. The process 500 may be implemented by one or more computing devices, entities, and/or systems described herein. For example, via the various steps/operations of the process 500, the computing system 100 may leverage the feature bias correction functions to overcome the various limitations with conventional bias mitigation processes that (i) lack generality across a number of different machine learning models and/or (ii) fail to account for individual differences unique to input data objects processed by the machine learning models.

FIG. 5 illustrates an example process 500 for explanatory purposes. Although the example process 500 depicts a particular sequence of steps/operations, the sequence may be altered without departing from the scope of the present disclosure. For example, some of the steps/operations depicted may be performed in parallel or in a different sequence that does not materially impact the function of the process 500. In other examples, different components of an example device or system that implements the process 500 may perform functions at substantially the same time or in a specific sequence.

According to some examples, the process 500 includes, at step/operation 502, receiving an aggregate bias correction function for a machine learning model. For example, the computing system 100 may receive the aggregate bias correction function for a machine learning model. As described herein, the aggregate bias correction function may include a contextual bias correction function configured to output an individualized contextual threshold for the input data object and/or a protected bias correction function configured to output an individualized protection threshold for the input data object.

According to some examples, the process 500 includes, at step/operation 504, generating, using the aggregate bias correction function, an individualized threshold corresponding to an input data object for the machine learning model. For example, the computing system 100 may generate, using the aggregate bias correction function, the individualized threshold corresponding to the input data object for the machine learning model. The individualized threshold may be based on (i) a plurality of contextual attributes of the input data object and (ii) a plurality of protected attributes of the input data object. By way of example, the individualized threshold may include an aggregate bias correction threshold, an individualized contextual threshold, an individualized protection threshold, and/or the like. In some embodiments, the individualized threshold may include an aggregate bias correction threshold that includes an aggregation (e.g., product, arithmetic mean, and/or the like) of the individualized contextual threshold and the individualized protection threshold for an input data object.

The aggregate bias correction function, for example, may include (i) a contextual bias correction function configured to output the individualized contextual threshold for the input data object based on the plurality of contextual attributes of the input data object and/or (ii) a protected bias correction function configured to output the individualized protection threshold for the input data object based on the plurality of protected attributes of the input data object. Each subfunction of the aggregate bias correction function may separately generate a respective threshold corresponding to the input data object based on different attributes of the input data object.

For example, the input data object may be associated with a contextual tensor including a plurality of contextual attributes that describe one or more non-protected characteristics of the input data object. In addition, or alternatively, the input data object may be associated with a protected tensor including a plurality of protected attributes that describe one or more protected characteristics of the input data object. The contextual tensor and the protected tensor may be mutually exclusive and may each include different values corresponding to different characteristics of the input data object.

The computing system 100 may generate the individualized contextual threshold by identifying the plurality of contextual attributes corresponding to the input data object. In some embodiments, the computing system 100 may extract the plurality of contextual attributes from the input data object to generate a contextual tensor for the input data object. In addition, or alternatively, the computing system 100 may identify a predefined contextual tensor associated with the input data object. The computing system 100 may generate, using a contextual bias correction function, an individualized contextual threshold for the input data object based on the plurality of contextual attributes. For instance, the computing system 100 may generate the individualized contextual threshold for the input data object by applying the contextual bias correction function to the contextual tensor. The computing system 100 may generate the individualized threshold for the input data object based on the individualized contextual threshold for the input data object. For example, the individualized contextual threshold may include one component of the individualized threshold.

In addition, or alternatively, the computing system 100 may generate the individualized contextual threshold by identifying the plurality of protected attributes corresponding to the input data object. In some embodiments, the computing system 100 may extract the plurality of protected attributes from the input data object to generate a protected tensor for the input data object. In addition, or alternatively, the computing system 100 may identify a predefined protected tensor associated with the input data object. The computing system 100 may generate, using a protected bias correction function, an individualized protection threshold for the input data object based on the plurality of protected attributes. For instance, the computing system 100 may generate the individualized protection threshold for the input data object by applying the protected bias correction function to the protected tensor. The computing system 100 may generate the individualized threshold for the input data object based on the individualized protection threshold for the input data object. For example, the individualized protection threshold may include one component of the individualized threshold.

According to some examples, the process 500 includes, at step/operation 506, generating, using the machine learning model, a predictive output for the input data object. For example, the computing system 100 may generate, using the machine learning model, the predictive output for the input data object. The predictive output may be based on a plurality of contextual attributes of the input data object. In addition, or alternatively, the predictive output may be based on the plurality of contextual attributes and a plurality of protected attributes of the input data object. The predictive output may depend on the machine learning model and/or the machine learning process. In some embodiments, for example in a diagnostic context, predictive output may include a classification probability corresponding to one or more classifications (e.g., a diagnosis classification, and/or the like). In some embodiments, the predictive output includes a real number between zero and one.

According to some examples, the process 500 includes, at step/operation 508, generating a bias adjusted output for the input data object based on a comparison between the individualized threshold and the predictive output. For example, the computing system 100 may generate the bias adjusted output for the input data object based on the comparison between the individualized threshold and the predictive output. The bias adjusted output, for example, may include a predicted classification from the one or more classifications.

By way of example, the predictive output may include a probability such as a classification probability that is represented by a first real number between zero and one. The individualized threshold may include a modified classification threshold corresponding to the one or more classifications. The modified classification threshold may include a classification threshold that is modified to adjust for potential biases individually associated with the input data object. The predicted classification may be based on a comparison between the modified classification threshold and the classification probability. For instance, the individualized threshold (e.g., a modified classification threshold) may be represented as a second real number between zero and one. The predicted classification may include (i) a first classification in the event that the classification probability is less than or equal to the individualized threshold, or (ii) a second classification (e.g., different from the first classification) in the event that the classification probability exceeds the individualized threshold.

The individualized threshold applied to the predictive output generated by the machine learning model may be a function of the contextual bias correction function as applied to the contextual attributes of the input data object, $f_1(x)$, and the protected bias correction function as applied to the protected attributes of the input data object, $f_2(a)$ (e.g., the aggregate bias correction function as applied to the input data object, $f(x,a)$). In the event that the predictive output, $h(x)$, is greater than the individualized threshold, $f(x,a)$, the computing system 100 may generate a first classification (e.g., a one, and/or the like). In the event that the predictive output, $h(x)$, is lower than or equal to the individualized threshold, $f(x,a)$, the computing system 100 may generate a second classification (e.g., a 0, and/or the like) that is different from the first classification.

According to some examples, the process 500 includes, at step/operation 510, providing data indicative of the bias adjusted output. For example, the computing system 100 may provide data indicative of the bias adjusted output. The data indicative of the bias adjusted output may include an indication of a classification, a confidence score for the classification, and/or the like.

Figure 6:
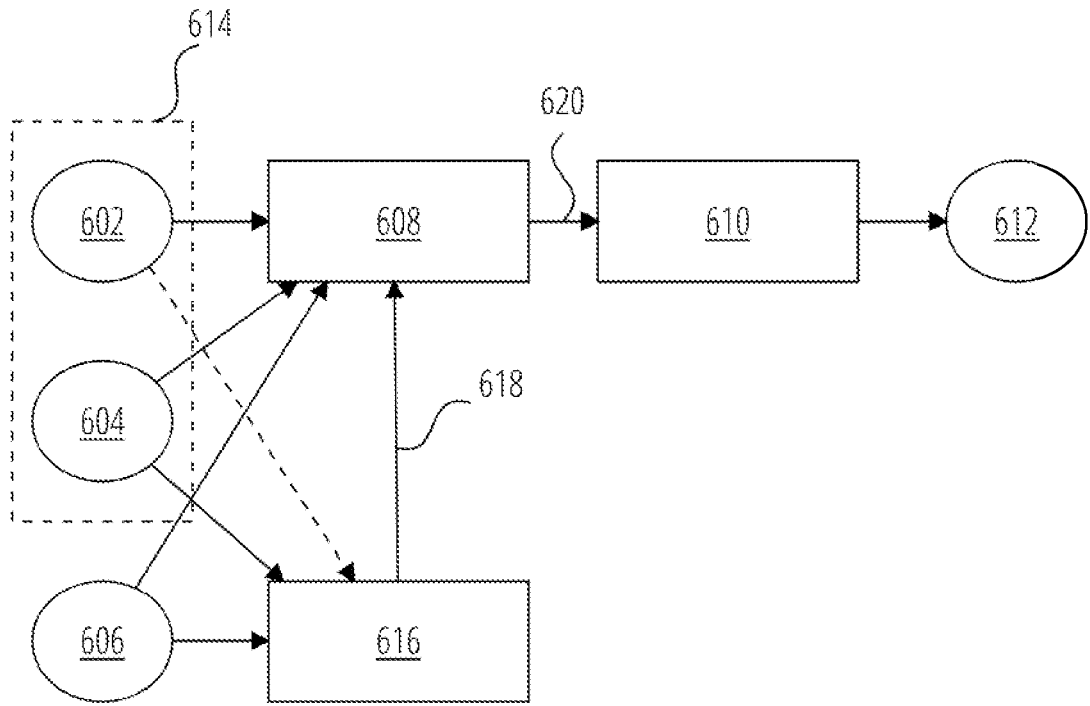
FIG. 6 is an operational example of a feature bias mitigation technique in accordance with some embodiments discussed herein.

FIG. 6 is an operational example 600 of a feature bias mitigation technique in accordance with some embodiments discussed herein. The operational example 600 includes an input data object 614 that includes a plurality of contextual attributes 604 and a plurality of protected attributes 602. In addition, the operational example 600 includes a ground truth label 606 corresponding to the input data object 614.

As described herein, the contextual attributes 604 and/or the ground truth label 606 may be input and/or applied to the machine learning model 616 to train the machine learning model 616 to generate predictive outputs 618 corresponding to the contextual attributes 604. The predictive outputs 618, for example, may include a probability of a classification and the ground truth label 606 may indicate a correct classification. In some embodiments, the machine learning model 616 may be trained to generate predictive outputs 618 without considering protected attributes 602 of the input data object 614. In addition, or alternatively, the protected attributes 602 may be input to the machine learning model

616 with the contextual attributes 604. In some embodiments, even if trained without the protected attributes 602, the machine learning model 616 may exhibit feature bias for one or more of the protected attributes 602.

To compensate for feature bias of the machine learning model 616, the operational example 600 includes an aggregate bias correction function 608 that is tailored to the machine learning model 616. As described herein, the aggregate bias correction function 608 may be generated based on the protected attributes 602, the contextual attributes 604, the ground truth labels 606, and/or the predictive outputs 618 of the machine learning model 616. The aggregate bias correction function 608 may be applied to the contextual attributes 604 and the protected attributes 602 to generate an aggregate bias correction threshold 620 (e.g., an individualized classification threshold) for the input data object 614. A classification function 610 may compare the predictive output 618 to the aggregate bias correction threshold 620 to determine a bias adjusted output 612. The bias adjusted output 612 may include a classification for the input data object 614 that is adjusted to each of the specific attributes (e.g., protected attributes 602, contextual attributes 604, and/or the like for the input data object 614.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

generating, by one or more processors, a contextual bias correction function for a machine learning model, wherein the contextual bias correction function comprises a plurality of contextual correction parameters configured to output an individualized contextual threshold for an input data object of the machine learning model based at least in part on a plurality of contextual attributes of the input data object by:

iteratively modifying the plurality of contextual correction parameters over a plurality of optimizing iterations, wherein an optimizing iteration comprises:

selecting a plurality of initial contextual correction parameters for the contextual bias correction function, selecting a plurality of initial protected correction parameters for a protected bias correction function, generating a plurality of training outputs for the machine learning model based at least in part on (i) a plurality of historical predictive outputs for the machine learning model, (ii) the plurality of initial contextual correction parameters, and (iii) the plurality of initial protected correction parameters, and generating a plurality of optimized contextual correction parameters for the optimizing iteration based at least in part on (i) the plurality of initial contextual correction parameters, (ii) the plurality of training outputs, and (iii) a plurality of ground truth labels corresponding to the plurality of historical predictive outputs, wherein the plurality of contextual correction parameters is based at least in part on the plurality of optimized contextual correction parameters;

generating, by the one or more processors, the protected bias correction function for the machine learning model, wherein the protected bias correction function comprises a plurality of protected correction parameters configured to output an individualized protection threshold for the input data object based at least in part on a plurality of protected attributes of the input data object;

generating, by the one or more processors, an aggregate bias correction function for the machine learning model based at least in part on the contextual bias correction function and the protected bias correction function; and providing, by the one or more processors, data indicative of the aggregate bias correction function, wherein the aggregate bias correction function is utilized with the machine learning model to generate a bias adjusted output for the input data object.

2. The computer-implemented method of claim 1, wherein the aggregate bias correction function is configured to output an aggregate bias correction threshold based at least in part on the plurality of protected attributes and the plurality of contextual attributes, wherein the aggregate bias correction threshold is a product of the individualized contextual threshold and the individualized protection threshold.

3. The computer-implemented method of claim 1, wherein generating the plurality of optimized contextual correction parameters for the optimizing iteration comprises:

determining, by the one or more processors, a false positive rate (FPR) for the machine learning model based at least in part on a comparison between the plurality of training outputs and the plurality of ground truth labels; and modifying, by the one or more processors, the plurality of contextual correction parameters to reduce the FPR.

4. The computer-implemented method of claim 1, wherein generating the plurality of training outputs comprises:

generating, by the one or more processors, a particular individualized contextual threshold for a particular input data object corresponding to a historical predictive output of the plurality of historical predictive outputs based at least in part on the plurality of initial contextual correction parameters;

generating, by the one or more processors, a particular individualized protection threshold for the particular input data object based at least in part on the plurality of initial protected correction parameters; and generating, by the one or more processors, a training output for the particular input data object by comparing the historical predictive output to the particular individualized contextual threshold and the particular individualized protection threshold.

5. The computer-implemented method of claim 1, wherein generating the protected bias correction function for the machine learning model comprises:

iteratively modifying, by the one or more processors, the plurality of protected correction parameters over the plurality of optimizing iterations, wherein the optimizing iteration further comprises:

generating, by the one or more processors, a second plurality of training outputs for the machine learning model based at least in part on (i) the plurality of historical predictive outputs for the machine learning model, (ii) the plurality of optimized contextual correction parameters, and (iii) the plurality of initial protected correction parameters; and generating, by the one or more processors, a plurality of optimized protected correction parameters for the optimizing iteration based at least in part on (i) the plurality of initial protected correction parameters, (ii) the second plurality of training outputs, and (iii) the plurality of ground truth labels, wherein the plurality of protected correction parameters is based at least in part on the plurality of optimized protected correction parameters.

6. The computer-implemented method of claim 1, wherein the optimizing iteration is a first iteration of the plurality of optimizing iterations, and wherein the plurality of initial contextual correction parameters and the plurality of initial protected correction parameters are randomly sampled from a parameter space.

7. The computer-implemented method of claim 1, wherein;

the optimizing iteration is a second iteration that is subsequent to a first iteration of the plurality of optimizing iterations, the plurality of initial contextual correction parameters comprises a plurality of previous optimized contextual correction parameters corresponding to the first iteration; and the plurality of initial protected correction parameters comprises a plurality of previous optimized protected correction parameters corresponding to the first iteration.

8. The computer-implemented method of claim 1, wherein the plurality of contextual correction parameters and the plurality of protected correction parameters are based at least in part on one or more parameter bounds.

9. The computer-implemented method of claim 8, wherein the one or more parameter bounds comprise an opportunity bound indicative of a minimum true positive rate between the plurality of training outputs and the plurality of ground truth labels of the machine learning model.

10. The computer-implemented method of claim 8, wherein the one or more parameter bounds comprise a bias bound indicative of a maximum disparity measure between the plurality of training outputs of the machine learning model.

11. The computer-implemented method of claim 1, wherein the contextual bias correction function is a first sigmoid function.

12. The computer-implemented method of claim 11, wherein the protected bias correction function is a second sigmoid function.

13. A system comprising:

one or more processors; and one or more memories storing processor-executable instructions that, when executed by the one or more processors, cause the one or more processors to perform operations comprising:

generating a contextual bias correction function for a machine learning model, wherein the contextual bias correction function comprises a plurality of contextual correction parameters configured to output an individualized contextual threshold for an input data object of the machine learning model based at least in part on a plurality of contextual attributes of the input data object by:

iteratively modifying the plurality of contextual correction parameters over a plurality of optimizing iterations, wherein an optimizing iteration comprises:

selecting a plurality of initial contextual correction parameters for the contextual bias correction function, selecting a plurality of initial protected correction parameters for a protected bias correction function, generating a plurality of training outputs for the machine learning model based at least in part on (i) a plurality of historical predictive outputs for the machine learning model, (ii) the plurality of initial contextual correction parameters, and (iii) the plurality of initial protected correction parameters, and generating a plurality of optimized contextual correction parameters for the optimizing iteration based at least in part on (i) the plurality of initial contextual correction parameters, (ii) the plurality of training outputs, and (iii) a plurality of ground truth labels corresponding to the plurality of historical predictive outputs, wherein the plurality of contextual correction parameters is based at least in part on the plurality of optimized contextual correction parameters;

generating the protected bias correction function for the machine learning model, wherein the protected bias correction function comprises a plurality of protected correction parameters configured to output an individualized protection threshold for the input data object based at least in part on a plurality of protected attributes of the input data object;

generating an aggregate bias correction function for the machine learning model based at least in part on the contextual bias correction function and the protected bias correction function; and providing data indicative of the aggregate bias correction function, wherein the aggregate bias correction function is utilized with the machine learning model to generate a bias adjusted output for the input data object.

14. The system of claim 13, wherein the aggregate bias correction function is configured to output an aggregate bias correction threshold based at least in part on the plurality of protected attributes and the plurality of contextual attributes, wherein the aggregate bias correction threshold is a product of the individualized contextual threshold and the individualized protection threshold.

15. The system of claim 13, wherein generating the plurality of optimized contextual correction parameters for the optimizing iteration comprises:

determining a false positive rate (FPR) for the machine learning model based at least in part on a comparison between the plurality of training outputs and the plurality of ground truth labels; and modifying the plurality of contextual correction parameters to reduce the FPR.

16. The system of claim 13, wherein generating the plurality of training outputs comprises:

generating a particular individualized contextual threshold for a particular input data object corresponding to a historical predictive output of the plurality of historical predictive outputs based at least in part on the plurality of initial contextual correction parameters;

generating a particular individualized protection threshold for the particular input data object based at least in part on the plurality of initial protected correction parameters; and generating a training output for the particular input data object by comparing the historical predictive output to the particular individualized contextual threshold and the particular individualized protection threshold.

17. The system of claim 13, wherein generating the protected bias correction function for the machine learning model comprises:

iteratively modifying the plurality of protected correction parameters over the plurality of optimizing iterations, wherein the optimizing iteration further comprises:

generating a second plurality of training outputs for the machine learning model based at least in part on (i) the plurality of historical predictive outputs for the machine learning model, (ii) the plurality of optimized contextual correction parameters, and (iii) the plurality of initial protected correction parameters; and generating a plurality of optimized protected correction parameters for the optimizing iteration based at least in part on (i) the plurality of initial protected correction parameters, (ii) the second plurality of training outputs, and (iii) the plurality of ground truth labels, wherein the plurality of protected correction parameters is based at least in part on the plurality of optimized protected correction parameters.

18. One or more non-transitory computer-readable media storing processor-executable instructions that, when executed by one or more processors, cause the one or more processors to perform operations comprising:

generating a contextual bias correction function for a machine learning model, wherein the contextual bias correction function comprises a plurality of contextual correction parameters configured to output an individualized contextual threshold for an input data object of the machine learning model based at least in part on a plurality of contextual attributes of the input data object by:

iteratively modifying the plurality of contextual correction parameters over a plurality of optimizing iterations, wherein an optimizing iteration comprises:

selecting a plurality of initial contextual correction parameters for the contextual bias correction function, selecting a plurality of initial protected correction parameters for a protected bias correction function, generating a plurality of training outputs for the machine learning model based at least in part on (i) a plurality of historical predictive outputs for the machine learning model, (ii) the plurality of initial contextual correction parameters, and (iii) the plurality of initial protected correction parameters, and generating a plurality of optimized contextual correction parameters for the optimizing iteration based at least in part on (i) the plurality of initial contextual correction parameters, (ii) the plurality of training outputs, and (iii) a plurality of ground truth labels corresponding to the plurality of historical predictive outputs, wherein the plurality of contextual correction parameters is based at least in part on the plurality of optimized contextual correction parameters;

generating the protected bias correction function for the machine learning model, wherein the protected bias correction function comprises a plurality of protected correction parameters configured to output an individualized protection threshold for the input data object based at least in part on a plurality of protected attributes of the input data object;

generating an aggregate bias correction function for the machine learning model based at least in part on the contextual bias correction function and the protected bias correction function; and providing data indicative of the aggregate bias correction function, wherein the aggregate bias correction function is utilized with the machine learning model to generate a bias adjusted output for the input data object.

\* \* \* \* \*